(12) United States Patent
Yuzawa (10) Patent No.: US 7,840,644 B2
(45) Date of Patent: Nov. 23, 2010

(54) INFORMATION DISTRIBUTION SYSTEM, INFORMATION RECEIVING APPARATUS, INFORMATION LIST FORMING METHOD, INFORMATION DELETING METHOD, AND INFORMATION STORING METHOD

(75) Inventor: Keiji Yuzawa, Saitama (JP)

(73) Assignee: Sony Corporation (JP)

( * ) Notice: Subject to any disclaimer, the term of this patent is extended or adjusted under 35 U.S.C. 154(b) by 2192 days.

(21) Appl. No.: 09/812,163

(22) Filed: Mar. 19, 2001

(65) Prior Publication Data
US 2002/0016185 A1 Feb. 7, 2002

(30) Foreign Application Priority Data
Mar. 17, 2000 (JP) ............................ P2000-076607

(51) Int. Cl.
*G06F 15/16* (2006.01)
(52) U.S. Cl. ......................................... 709/217; 725/46
(58) Field of Classification Search .................. 725/46, 725/45, 44; 455/556.1; 345/721; 386/46; 375/240.28; 709/217
See application file for complete search history.

(56) References Cited
U.S. PATENT DOCUMENTS
5,652,613 A 7/1997 Lazarus et al.

(Continued)

FOREIGN PATENT DOCUMENTS
CN 1187279 A 7/1998

(Continued)

OTHER PUBLICATIONS
English Translation of Japanese Office Action issued on May 19, 2009, issued in Japanese Patent Application No. 2000-076607.

(Continued)

*Primary Examiner*—Jungwon Chang
(74) *Attorney, Agent, or Firm*—Lerner, David, Littenberg, Krumholz & Mentlik, LLP (57) ABSTRACT

In a system for providing information to a user through the use of a BS broadcast, information items can be displayed in an optimum order and the information can be deleted from or stored in a storage device in the optimum order. Attribute information showing information categories may be designated. When the information stored in the storage device is viewed, the number of times the information is viewed is counted for each category of the information by using the attribute information indicating the information category. A user access tendency is determined from the count value of the accessed category, and an access priority is determined from the user access tendency. Attribute information showing the priority of the information may also be designated. In this case, the access priority is determined from the attribute information indicating the information priority. When a list of the information stored in the storage device is displayed, it may be displayed in order from the highest access priority to the lowest. To assure a vacant area in the storage device, the information may be deleted in order from the information of the lowest access priority. When new information is stored in the storage device, the information of the highest access priority may be filtered and stored.

16 Claims, 10 Drawing Sheets

U.S. PATENT DOCUMENTS

| | | | | |
|---|---|---|---|---|
| 5,801,747 | A * | 9/1998 | Bedard | 725/46 |
| 5,848,396 | A * | 12/1998 | Gerace | 705/10 |
| 6,177,931 | B1 * | 1/2001 | Alexander et al. | 725/52 |
| 6,185,360 | B1 * | 2/2001 | Inoue et al. | 386/46 |
| 6,428,946 | B2 * | 8/2002 | Buongiorne et al. | 430/450 |
| 6,493,688 | B1 * | 12/2002 | Das et al. | 706/20 |
| 6,526,411 | B1 * | 2/2003 | Ward | 707/102 |
| 6,614,987 | B1 * | 9/2003 | Ismail et al. | 386/83 |
| 6,727,914 | B1 * | 4/2004 | Gutta | 345/719 |
| 6,842,604 | B1 * | 1/2005 | Cook et al. | 455/3.06 |

FOREIGN PATENT DOCUMENTS

| | | |
|---|---|---|
| EP | 0 190 837 A2 | 8/1986 |
| EP | 0 572 090 A2 | 1/1993 |
| EP | 0 854 645 A2 | 7/1998 |
| JP | 6-110421 A | 4/1994 |
| JP | 6-124309 A | 5/1994 |
| JP | 8-191282 A | 7/1996 |
| JP | 8-331077 A | 12/1996 |
| JP | 10-117331 A | 5/1998 |
| JP | 11-196389 A | 7/1999 |
| JP | 11-232840 A | 8/1999 |
| JP | 11-312190 A | 11/1999 |
| JP | 2001-509327 T | 7/2001 |
| JP | 2001-251259 A | 9/2001 |
| JP | 2001-525951 T | 12/2001 |
| WO | WO 93/07566 * | 4/1993 |
| WO | 9721183 A1 | 6/1997 |
| WO | WO-98/21877 A2 | 5/1998 |

OTHER PUBLICATIONS

Sumio Gando, Naohiko Tagawa, "Most recent trend survey of the online financial service in U.S.A.", Financial information system, Financial information system center Foundation, Jan. 1, 2000, No. 225, p. 68-93 (please refer to the description concerning the agreement of a preferential advertisement publication of p. 77 right column—p. 78 left column Cases of AOL, Yahoo, in particular).

* cited by examiner

CONNECTION (BAY FORMAT)

`<C-ID>number</C-ID>`

Fig. 6

| CATEGORY CODE | MAIN CLASSIFICATION | DETAILED CLASSIFICATION |
|---|---|---|
| 10 | AUTOMOBILES | SEDAN |
| 11 | | STATION WAGON |
| 12 | | SPORTS CAR |
| ⋮ | | ⋮ |
| 20 | MUSIC | CLASSICAL |
| 21 | | JAZZ |
| 22 | | ROCK |
| ⋮ | | ⋮ |
| 30 | MOVIES | COMEDY |
| 31 | | ACTION |
| 32 | | ADVENTURE |
| ⋮ | | ⋮ |
| | | |

Fig. 7

| CATEGORY CODE | COUNT VALUE |
|---|---|
| 10 | 5 |
| 11 | 7 |
| 12 | 9 |
| ⋮ | ⋮ |
| 20 | 21 |
| 21 | 30 |
| 22 | 20 |
| ⋮ | ⋮ |
| 30 | 1 |
| 31 | 0 |
| 32 | 2 |
| ⋮ | ⋮ |

Fig. 8

`<PRIORITY>number</PRIORITY>`

```
<TITLE>GOOD CAR</TITLE>
  <IMG SRC="CAR1.JPG">
  <PROPROTY>50</PRIORITY>
  <C-ID>10</C-ID>
       ⋮
<TITLE>BEST SONG</TITLE>
  <IMG SRC="SONG1.JPG">
  <PROPROTY>30</PRIORITY>
  <C-ID>20</C-ID>
       ⋮
```

Fig. 9A

```
<TITLE>DIR</TITLE>
  <P>GOOD CAR</P>
       ⋮
  <P>BEST SONG</P>
       ⋮
```

| ITEM ID 1 : CATEGORY CODE, PRIORITY, INFORMATION AMOUNT |
| ITEM ID 2 : CATEGORY CODE, PRIORITY, INFORMATION AMOUNT |
| - - - - - - - - - - - - - - - - - - - - - - - - - - - |
| ITEM ID 3 : CATEGORY CODE, PRIORITY, INFORMATION AMOUNT |

INFORMATION DISTRIBUTION SYSTEM, INFORMATION RECEIVING APPARATUS, INFORMATION LIST FORMING METHOD, INFORMATION DELETING METHOD, AND INFORMATION STORING METHOD

CROSS-REFERENCE TO RELATED APPLICATIONS

This application claims priority from Japanese Application No. P2000-076607 filed on Mar. 17, 2000, the disclosure of which is hereby incorporated by reference herein.

BACKGROUND OF THE INVENTION

The invention relates to an information processing method and an information receiving apparatus which are suitable for use in a system such that information is distributed by using, for example, a BS (Broadcast Satellite) broadcast, the information is stored, and when the user wants to view it, the stored information can be viewed.

A system which provides information to the user by using BS broadcasts has been considered. That is, although BS broadcasts are used for transmitting a digital satellite broadcast, the broadcast is finished at night and the user hardly watches the broadcast. The information may be transmitted by the BS broadcast using a time interval in the night-time. The information is stored in the storage device of a contracted user terminal. The user views the information stored in the storage device at a desired time.

If the system is designed in a manner such that data can be transmitted and received through, for example, a telephone line between the storage device in which the received information has been stored and an information distribution center which provides the information, the user can return an action to the information distribution center on the basis of the stored information. For example, if shopping information is transmitted from the information distribution center, the user can return a request to purchase goods to the information distribution center in accordance with the information. It is, therefore, considered that such a system can be used in various fields such that contents, such as movies or music, are distributed and sold, an advertisement or brochure for goods is distributed and the goods are sold, travel information is distributed and a reservation for an airline ticket or a hotel room is made, information concerning plays, concerts or other performances is distributed and a ticket is reserved and sold, and the like.

In such a system, when a list of information items stored in the storage device is displayed and desired information is designated from the list of the information items, the designated information may be viewed. The information in the storage device is always updated by the operation of the user. Therefore, the list of the information stored in the storage device is formed on the user terminal side.

When the list of the information items stored in the storage device is displayed, the information may be sequentially arranged in the order of names or storing dates like "A, B, C, . . . " or "a, b, c, d, e". If the information is arranged in this manner, however, information in which the user is not much interested may be arranged at the beginning of the list and information in which the user is interested may be arranged at the end of the list. There is also a possibility that some information may have priority, and it is desired to arrange the information of higher priority at the beginning of the list.

In such a system, although the information received at night is successively stored in the storage device, the memory capacity of the storage device is limited. When new information is stored, therefore, it may be necessary to delete some information which has been stored previously. One method of deleting the stored information is to sequentially delete the information in the order in which it was stored, oldest first. However, if such a method is used, there is a possibility that information that is used frequently by the user or information having high priority may be deleted.

Further, when information received at night is stored in the storage device, if it is stored in the order in which it is received, the storage device may be filled by useless information, and when an attempt is made to store information of interest to the user or information having high priority, there may be insufficient storage capacity available in the storage device.

SUMMARY OF THE INVENTION

It is, therefore, an object of the invention to provide an information processing method and an information receiving apparatus, in which information items can be displayed in an optimum order and information can be deleted from or stored in a storage device in the optimum order. According to the invention, attribute information indicating a category of information is designated. When the information stored in the storage device is accessed, the number of times it is accessed is counted for each category of information by using the attribute information indicating the category of the information. The access tendency of the user may be determined for each item of information from the count value of each category of accessed information. The access priority for each item of information may be determined from the access tendencies of the user.

Attribute information indicative of the priority of each item of information may also be designated. The access priority may be determined for each item of information from the attribute information indicating the priority of the information.

When a list of the information items stored in the storage device is displayed, the access priority for each item of information may be determined from the attribute information showing the access tendencies of the user determined as described above or from the priority of the information, and the list of the items of information may be displayed in an order beginning with the item of information having the highest access priority.

When the information stored in the storage device is deleted in order to assure a vacant storage area in the storage device, the access priority for each item of information may be determined from the attribute information indicating the access tendencies of the user determined as described above or from the priority of the information, and the items of information may be deleted in an order beginning with the item of information having the lowest access priority.

When new information is stored in the storage device, the access priority for each item of information may be determined from the attribute information indicating the access tendencies of the user determined as described above or from the priority of the information, and the items of information having the highest access priorities are filtered and stored.

The above and other objects and features of the present invention will become apparent from the following detailed description and the appended claims with reference to the accompanying drawings.

DETAILED DESCRIPTION OF THE PREFERRED EMBODIMENTS

Figure 1:
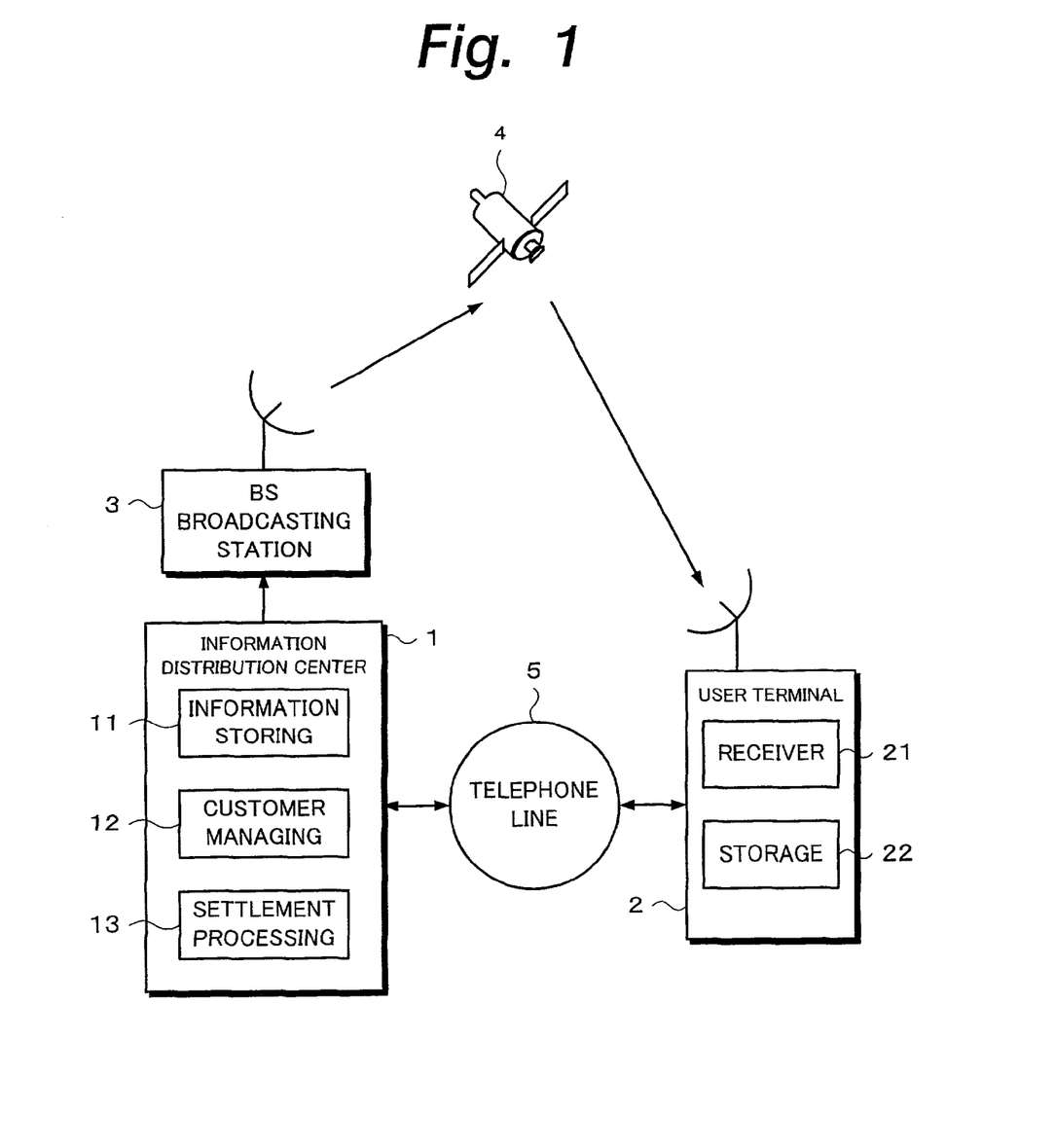
FIG. 1 is a block diagram showing the construction of an information distribution system using a BS satellite in accordance with the present invention.

An embodiment of the invention will now be described with reference to the drawings. FIG. 1 shows the construction of a system to which the invention is applied. In FIG. 1, reference numeral 1 denotes an information distribution center. The information distribution center 1 provides various information, such as moving images, still images, audio sound, and the like, to the user by using a BS broadcast. The information distribution center 1 may be used, for example, in arrangements in which the contents of movies or music are distributed and sold or in which an advertisement or brochure for goods is distributed and the goods are sold. Further, there may be arrangements in which travel information is distributed and an airline ticket or a hotel room is reserved, in which information concerning plays, concerts or other performances is distributed and a ticket is reserved, and the like.

An information storing unit 11 in which information to be distributed has been stored is provided for the information distribution center 1. The moving images, still images, audio sound, and the like of the contents, which are provided as information, text information, and the like, have been stored in the information storing unit 11. As will be explained hereinbelow, the information is transmitted in the form of a description language such as XML (Extensible Markup Language), BML (BS Markup Language), or HTML (Hyper Text Markup Language). The moving images, still images, and audio sound are compressed and transmitted. As a compression system for the moving images, for example, an MPEG (Moving Picture Experts Group) 2 may be used. As a compression system for the still images, a JPEG (Joint Photographic Experts Group) or a GIF (Graphics Interchange Format) may be used. As a compression system for the audio sound, for example, an AAC (Advanced Audio Coding) may be used. The compression systems are not limited to those mentioned above.

The information distribution center 1 also includes a customer managing unit 12 for managing customers, and a settlement processing unit 13 for managing a settlement process. The information storing unit 11, customer managing unit 12, and settlement processing unit 13 can be provided at different locations and can be managed by different companies, respectively. Where the information storing unit 11, customer managing unit 12, and settlement processing unit 13 are provided at different locations, it is desirable to connect the information storing unit 11, customer managing unit 12, and settlement processing unit 13 onto a network and enable information to be transmitted and received mutually.

The information distribution center 1 sends the information to a broadcasting station 3. The broadcasting station 3 distributes the received information to each user through a BS satellite 4. In one arrangement, the information may be distributed at night when the user hardly watches the broadcast after the end of the BS broadcast.

Reference numeral 2 denotes a user terminal. The user terminal 2 includes a receiver 21 for receiving a signal which is transmitted from the information distribution center 1 through the broadcasting station 3 and BS satellite 4, and a hard disk drive or other storage device 22 for storing the transmitted information.

Figure 2A:
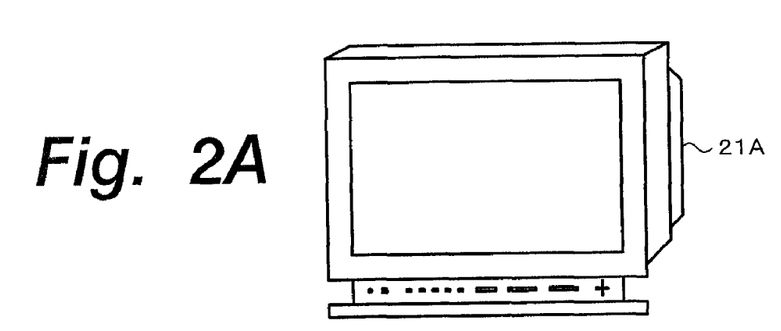
FIGS. 2A to 2C are perspective views for use in explanation of a user terminal in the information distribution system of the present invention.
Figure 2B:
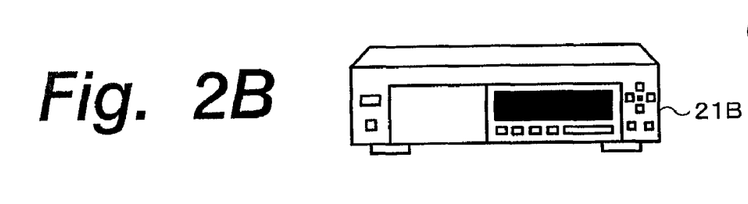

The receiver 21 receives a digital BS broadcast. Such receiver may include, for example, a receiver 21A integrated with a television (TV) receiver as shown in FIG. 2A, or a receiver 21B of a tuner type which is connected to an RF input or a video input of the existing TV receiver, as shown in FIG. 2B.

Figure 2C:
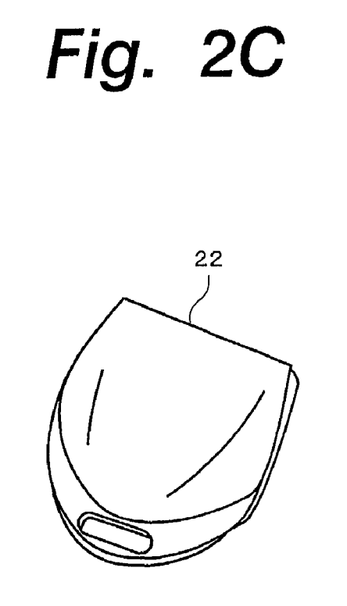

As shown in FIG. 2C, the storage device 22 is provided separately from the receiver 21, although it is connected to the receiver 21. A modem is provided for the storage device 22, thereby enabling data to be transmitted to and received from the information distribution center 1 through a telephone line 5.

Although the storage device 22 and receiver 21 may be connected by a cable, in another arrangement an attaching portion is provided for the receiver 21A integrated with the TV receiver or for the receiver 21B of the tuner type, and the storage device 22 is attached to the attaching portion. With such a construction, the receiver 21 and storage device 22 can be easily connected.

As a connecting form between the receiver 21 and storage device 22, IEEE1394 or the like can be used. Another general interface or a dedicated interface can be also used.

As mentioned above, an ordinary receiver for receiving the digital BS broadcast may be used as a receiver 21 and the storage device 22 is provided separately from it. A browser by which script such as BML can be viewed is installed as a standard device on the receiver 21.

The storage device 22 may be purchased at a retail store or service shop or provided as a rental device. The user who wants to use the information distribution service constructs the user terminal 2 by attaching the storage device 22 to the receiver 21 and enters into a contract with the information distribution center 1.

As mentioned above, a modem has been provided in the storage device 22 and data can be transmitted to and received from the information distribution center 1 through the telephone line 5. Therefore, a contract with the information distribution center 1 can be made through the telephone line 5.

By making the contract in this way, the customer information may be registered directly in the customer managing unit 12 of the information distribution center 1.

The information from the information storing unit 11 of the information distribution center 1 is sent to the broadcasting station 3 and transmitted from the broadcasting station 3 toward each user terminal 2 through the BS satellite 4. The information may be transmitted, for example, at night, as mentioned above. The information is received by the receiver 21 of the user terminal 2 and temporarily stored in the storage device 22. As mentioned above, if the storage device 22 is attached to the receiver 21 and a contract with the information distribution center 1 has been made, the information transmitted from the information distribution center 1 through the broadcasting station 3 and BS satellite 4 is received by the receiver 21 of the user terminal 2 and stored in the storage device 22. When the user wants to view the information stored in the storage device 22, he can view it any time.

When viewing the information stored in the storage device 22 of the user terminal 2, the browser of the receiver 21 is activated. A location (URL) designated by the user input from the information stored in the storage device 22 is given. Thus, the information at a desired location is accessed from the data of the information stored in the storage device 22 and a page is viewed in accordance with its description.

The storage device 22 is an intelligent storage device and functions as a pseudo server which provides contents data. Therefore, the viewing process can be performed by the browser on the receiver 21 and the load on the hardware is small. That is, if the information has been stored in an external storage device, desired information ordinarily would be read out from the external storage device, decoded, converted into a video signal, synthesized, and displayed. The desired information may be read out from the external storage device, decoded, developed into a memory, synthesized, and displayed. However, either of those methods requires an image processing circuit.

In the present invention, therefore, the storage device 22 is constructed as an intelligent device. From the receiver 21, the storage device 22 is seen as a server which provides information. That is, on the receiver 21 side, the browser is activated, a location in the storage device 22 is designated, and the location is accessed. Thus, the information is provided from the storage device 22, and a multimedia picture plane is formed by the browser and displayed. In this case, all of the viewing operations can be performed by the browser and there is no need to add a circuit for image processing.

As mentioned above, this system may be used for the sale of contents, such as movies or music, or the sale of goods. For the sale of goods, if there are favorite goods, the user designates them and inputs the designations. Thus, purchase information for the goods is sent from the user terminal 2 to the information distribution center 1 through the telephone line 5. The information distribution center 1 refers to personal information for the user who wants to purchase the goods in the customer managing unit 12, and payment information for the user in the settlement processing unit 13, and delivers the goods to the user if there is no problem on settlement.

If the goods to be sold are articles, the goods are delivered to the user as mentioned above. If the goods to be sold are a movie or music, they can be directly distributed as information. However, if the contents of the movie or music are directly distributed, all users can watch the movie or listen to the music. Therefore, when the information to be distributed is the contents of a movie or music, for example, the information may be encrypted before transmission. If there is a favorite movie or music, the user designates them and inputs the designations. A decoding key to decrypt the encrypted information may be sent from the user terminal 2 to the information distribution center 1 through the telephone line 5. If the decoding key is set to the user terminal 2, the encryption is decoded, so that the user can watch the purchased movie or listen to the purchased music. Thus, where the purchased goods are articles, the goods themselves are delivered. Where the purchased goods are the contents of movies or music, a decoding key may be sent from the user terminal 2 to the information distribution center 1 through, for example, a telephone line.

If the user wants to purchase the goods, the decoding key to decrypt the encryption of the goods need not be sent from the user terminal 2 to the information distribution center 1. Rather, the system may be constructed so that the decoding key is sent to the contracted user and if the encryption is decrypted on the user terminal 2 side, information showing that the encrypted goods were decrypted may be sent from the user terminal 2 to the information distribution center 1 through the telephone line 5, thereby enabling a charge processing unit to charge the user.

Figure 3:
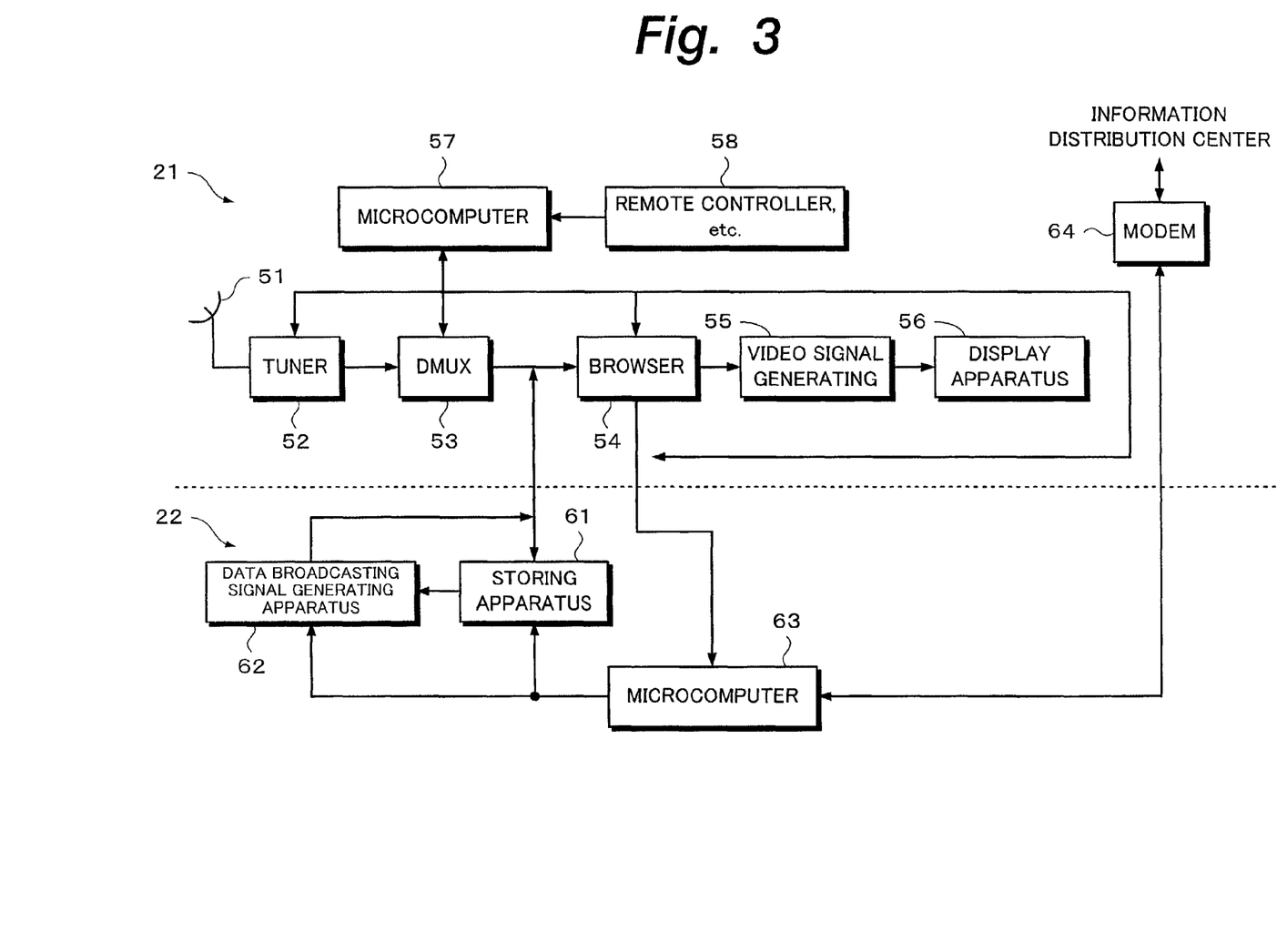
FIG. 3 is a block diagram showing the construction of the user terminal in the information distribution system of the present invention.

FIG. 3 shows the construction on the user terminal 2 side in such a system. In FIG. 3, the signal from the BS satellite is received by a parabolic antenna 51. Although not shown, this signal is converted into an intermediate frequency signal by an LNB (Low Noise Block Down Converter) attached to the parabolic antenna 51. The output of the LNB is supplied to a tuner circuit 52. The receiving frequency of the tuner circuit 52 is set by the output of a microcomputer 57 in accordance with the channel input by a remote controller 58.

In the tuner circuit 52, the signal of a desired carrier is selected from the reception signal, the reception signal is demodulated, and a transport stream is decoded. This stream is supplied to a demultiplexer 53. In the demultiplexer 53, a desired packet is separated from the transport stream.

The output of the demultiplexer 53 is supplied to a browser 54. The browser 54 is used to view a multimedia picture plane. Based on the description languages in which the information is transmitted, the browser 54 forms the multimedia picture plane comprising a moving image, a still image, audio sound, text, and the like. The output of the browser 54 is supplied to a video signal generating circuit 55. The output of the video signal generating circuit 55 is supplied to a display apparatus 56.

The storage device 22 has a storing apparatus 61, a data broadcasting signal generating apparatus 62, and a microcomputer 63. A modem 64 is connected to the microcomputer 63. The modem 64 enables data to be transmitted and received through the telephone line between the microcomputer 63 of the storage device 22 and the information distribution center 1.

The signal transmitted from the broadcasting station 3 through the satellite 4 is received by the parabolic antenna 51. When the various information as mentioned above is transmitted from the broadcasting station 3, the information is decoded by the tuner circuit 52, output from the demultiplexer 53, and stored in the storing apparatus 61.

Figure 4:
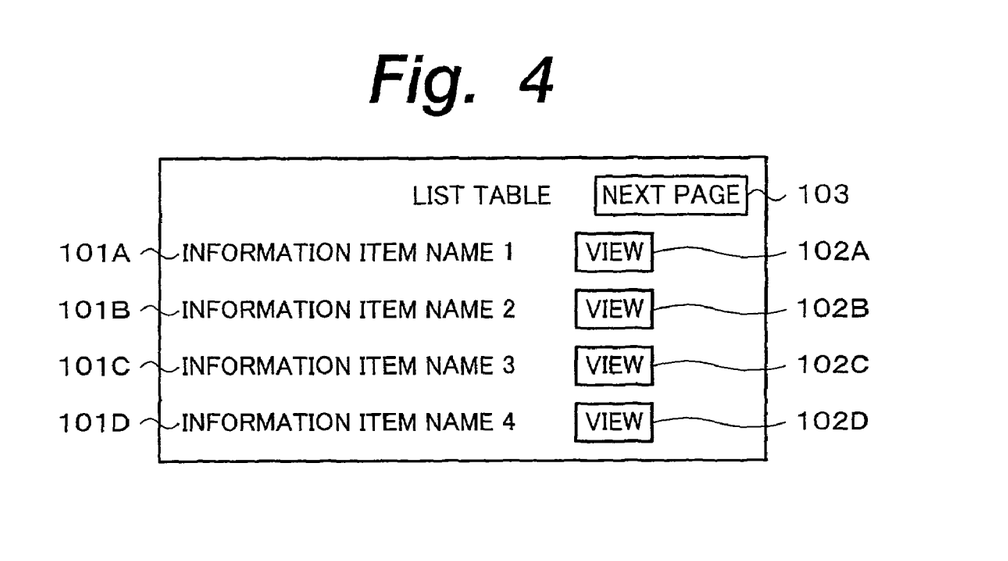
FIG. 4 is a schematic diagram showing an example of a list of information items.

A table listing the information items stored in the storing apparatus 61 is formed by the data broadcasting signal generating apparatus 62. FIG. 4 shows an example of a display of a list of information items. In this example, item names 101A, 101B, 101C, and 101D, view keys 102A, 102B, 102C, and 102D, and a next page key 103 are displayed in the table listing the information items. Where music has been distributed, the item names may include the titles and artist names of the music. Where goods have been sold, the item names may be the names of the goods, etc. The view keys 102A, 102B, 102C, and 102D are used for displaying the moving image or still image information associated with each of the item names, or for reproducing music.

The moving image information, still image information, music information, and text information transmitted by the BS satellite 4 have been stored in the storing apparatus 61. From that information, information (this information is also described by the XML, BML, or HTML) for displaying the table listing the information items is formed by the data broadcasting signal generating apparatus 62. The information for listing the information items is sent from the data broadcasting signal generating apparatus 62 to the browser 54. Thus, for example, a list of music information as shown in FIG. 4 may be displayed.

To use the information stored in the storage device 22, a list of information items as shown in FIG. 4 is displayed. Necessary information is selected from the list of the information items by actuating the view keys 102A, 102B, 102C, and 102D, for example, by operating the remote controller 58.

When desired information is designated, an input is sent from the microcomputer 57 to the browser 54. On the basis of this input, the location of the designated information is supplied from the browser 54 to the microcomputer 63. In the microcomputer 63, the information existing at the input location is accessed and this information is sent to the browser 54 and displayed by the display apparatus 56.

As mentioned above, in this example, the received information is stored in the storing apparatus 61. A table listing the information items stored in the storing apparatus 61 is formed by the data broadcasting signal generating apparatus 62 of the storage device 22.

When the information items are arranged into the table listing the information items, the information items may be arranged in the order of names or in the order of storing dates "A, B, C, . . . " or "a, b, c, d, e". However, if the information items are arranged in this manner, information in which the user is not much interested may be arranged at the beginning of the list and information in which the user is interested may be arranged at the end of the list. Therefore, categories of information having prescribed attributes may be pre-designated according to the invention. The attributes for each category indicate the type of information the category contains. The access tendency of the user can be determined by using the information categories.

Figure 5:
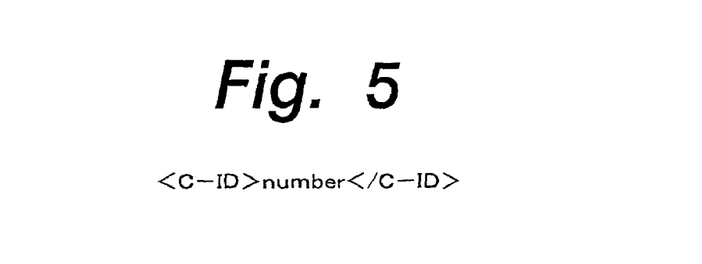
FIG. 5 is a diagram showing an example of a tag indicative of a category code.
Figure 6:
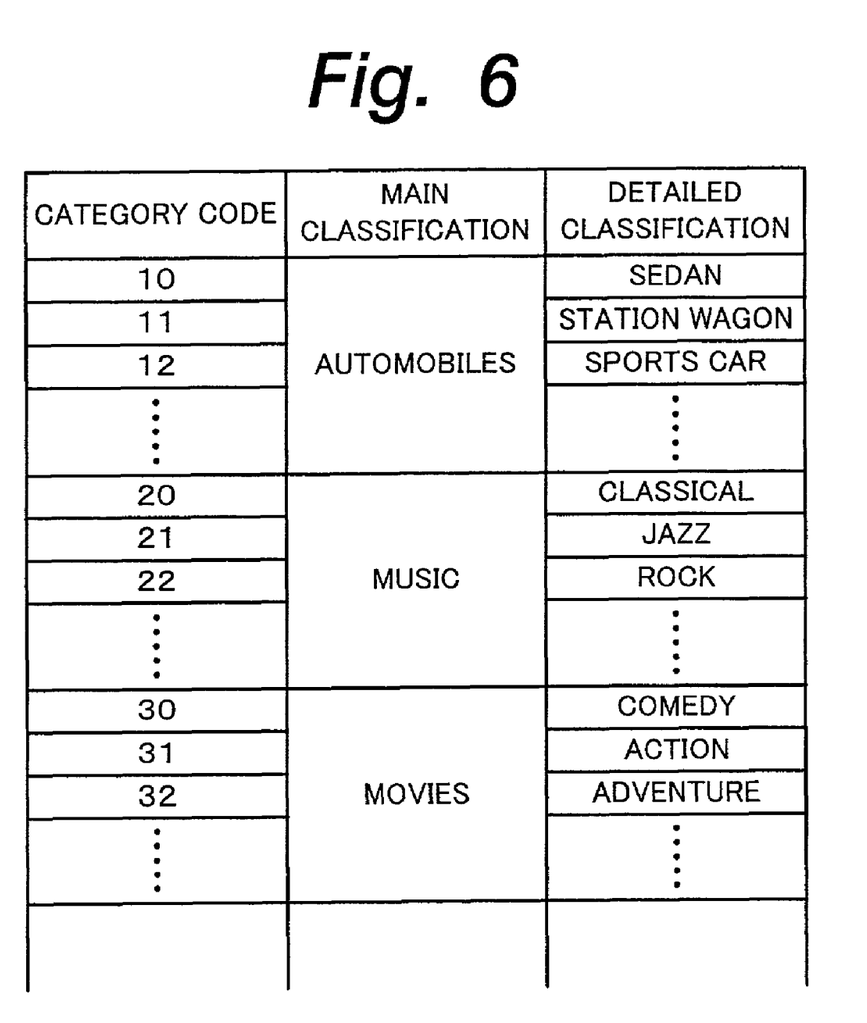
FIG. 6 is a schematic diagram for use in explanation of the category codes.

For example, as shown in FIG. 5, the attributes of the category may be expressed by the category code number between the tag <C-ID> and the tag </C-ID>. According to the category code, for example, as shown in FIG. 6, the first digit shows a main classification in a manner such that "10" to "19" indicate the field of automobiles, "20" to "29" indicate the field of music, and "30" to "39" indicate the field of movies. Further, in the field concerning automobiles, the second digits indicate detailed classification in a manner such that "10" indicates a sedan, "11" indicates a station wagon, and "12" indicates a sports car.

Figure 7:
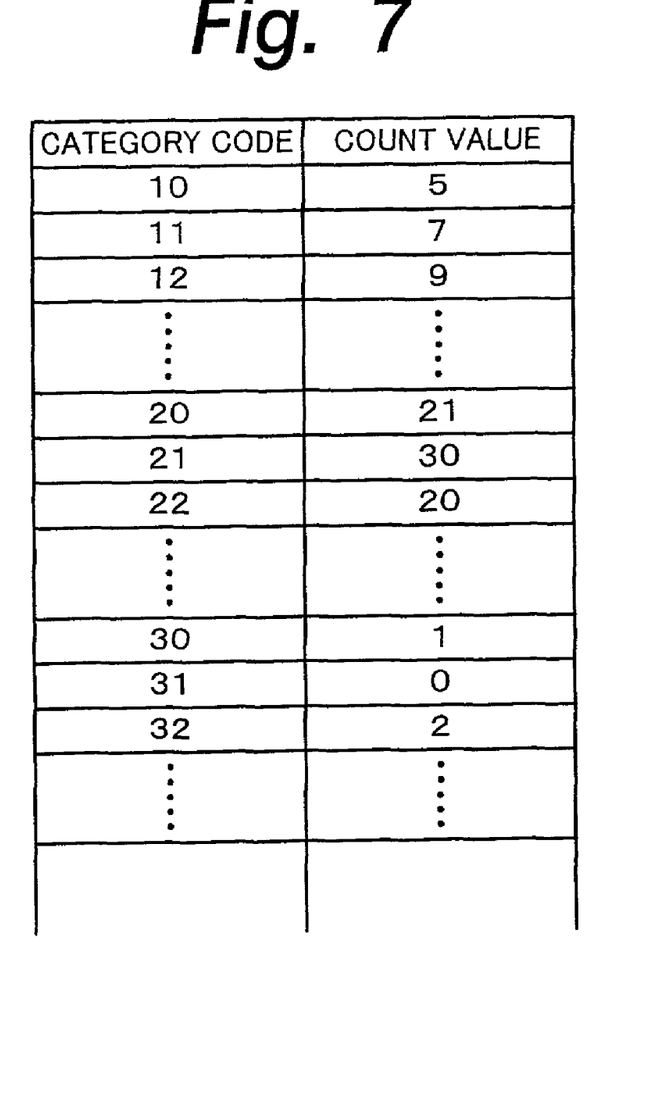
FIG. 7 is a schematic diagram for use in explanation of the category codes.

A click counter may be provided for the microcomputer 63 for every category code, as shown in FIG. 7. Each time the user presses the view keys 102A, 102B, 102C, . . . in the table and accesses the information, the click counter value corresponding to the category code of the accessed information is increased. As a result, the access tendency of the user can be easily determined.

For example, if the count value of the click counter for the category code whose first digit is equal to "1", like category codes "11" or "12", is large, it will be understood that the user is interested in automobiles and is likely to access information regarding automobiles.

When the table listing the information items stored in the storing apparatus 61 is formed by the data broadcasting signal generating apparatus 62, the count values of the click counters may be referred to. The information items may be arranged in order from the largest count value to the smallest. Thus, the information item list may be displayed in accordance with the access tendency of the user.

As noted, the order of the information items may be determined in the data broadcasting signal generating apparatus 62 of the user terminal 2 on the basis of the access tendency of the user. However, the order also can be determined on the information distribution center 1 side.

That is, each time one of the view keys 102A, 102B, 102C, . . . of the table is pressed, the category code of the information is stored. When the information items are viewed several times as mentioned above, the categories are sequentially stored. When the user terminal 2 is connected to the information distribution center 1 through the telephone line 5, a list of the category codes stored so far is sent to the information distribution center 1. In the information distribution center 1, a category order table may be formed in an order from the highest viewing frequency to the lowest. The category order table is sent from the information distribution center 1 to the user terminal 2. In the data broadcasting signal generating apparatus 62 of the storage device 22, the table listing the information items may be formed in an order based on the category order table supplied from the information distribution center 1.

As mentioned above, in the above example, since the tags (<C-ID> . . . </C-ID>) indicative of the attributes of the categories are pre-designated, the list of the information items can be arranged in the order of how frequently the user views them. Thus, a list of information items which can be easily used by the user can be provided.

The information item list may also be displayed in the order of significance of the information. For example, when the information is advertisements, advertisements for which sponsors paid a higher fee may be considered more significant. In this case, the significance of the information may be based on the advertising fee paid by the sponsors, the higher the fee, the higher the significance. The advertisements may then be displayed so that those for which a higher fee has been paid are displayed before those for which a lower fee has been paid.

Figure 8:
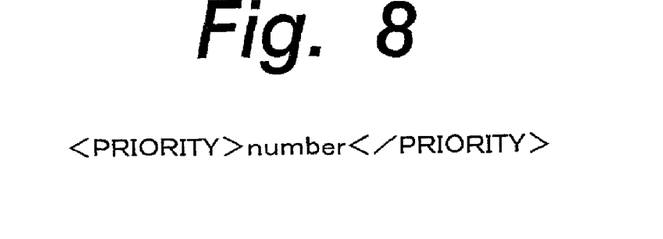
FIG. 8 is a diagram showing an example of a tag indicative of a priority.

In the invention, therefore, attributes indicating the significance of the information may be designated. For example, as shown in FIG. 8, the attributes indicating the significance may be expressed by a number between the tag <PRIORITY> and the tag </PRIORITY>, which indicates the priority of the information.

The priority of the information may be referred to when the table listing the information items stored in the storing apparatus 61 is formed by the data broadcasting signal generating apparatus 62. The information items may be arranged in order from the highest priority to the lowest.

Further, the order of the information item list may be determined by using both access tendency and priority value. In this case, a control ratio according to the access tendency and a control ratio according to the priority are first determined. The general priority is determined from these control ratios by the following equation:

$$(\text{view frequency}) \times \alpha + (\text{priority}) \times (1-\alpha) = \text{general priority}$$

The view frequency denotes the count value of the counter for the category code viewed. The item priority is expressed by a numeral within a range of 100 to 1, with 100 indicating the maximum priority. α denotes a ratio of both control ratios and has a value of 0 to 1. The general priority indicates a result of the above relational expression, and determines the display order in the table listing the information items. For example, assuming that α=0.5, the view frequency=20, and the priority=30, the general priority is equal to 25.

When forming the table listing the information items using both the access tendency of the user and the priority, the general priority is obtained by the above equation. The information items are arranged in order from the highest general priority to the lowest general priority.

As mentioned above, in the system to which the invention is applied, with respect to the list of the information items, the order of information items may be determined by using the access tendency of the user, the priority of the information, or both. Therefore, the information which the user wants to know or the information of higher priority is arranged at an upper position in the information item list.

Figure 9A:
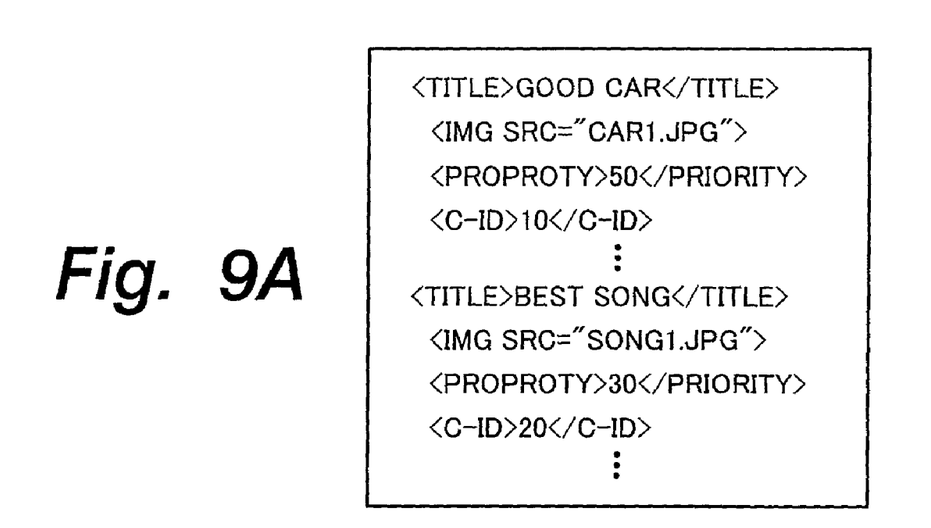
FIGS. 9A and 9B are schematic diagrams for use in explanation of scripts.

FIG. 9A shows an example of the information which is sent. As shown in FIG. 9A, the tags (<C-ID> . . . </C-ID>) showing the category codes are included in the information, as mentioned above. The category of the information is known from the number surrounded by the tags indicating the category codes. The access tendency of the user for the category can be determined by counting the number of times the user viewed information in that category.

The tags (<PRIORITY> . . . </PRIORITY>) indicating the significance are also included in the information. The significance of the information is known from the number surrounded by the tags indicating the significance.

Figure 9B:
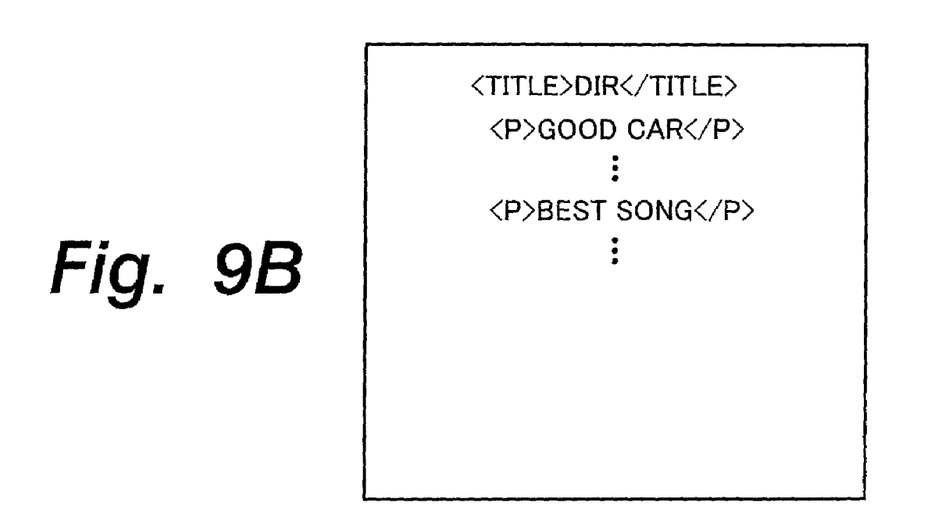

FIG. 9B shows an example of the information item list. The list of the information items can be formed by arranging the information shown in FIG. 9A in the order of general priority using the access tendency of the user, the priority of the information or both of these values.

For example, if a template of the information item list is prepared and title information (<TITLE> . . . </TITLE>) is allocated into (<P> . . . </P>) of the template in the order of the number surrounded by the tags (<PRIORITY> . . . </PRIORITY>) showing the significance of each information item, an information item list in which the item information has been arranged in the order of significance can be formed.

Where the list of item information is arranged in the order of access tendency of the user or significance, the number of times each code between the tags (<C-ID> . . . </C-ID>) appears is counted, and the title information (<TITLE> . . . </TITLE>) is allocated into (<P> . . . </P>) of the template in the order of count value, so that an information item list in which the item information has been arranged in the order of access tendency can be formed.

In this example, the access tendency of the user is known by the tags (<C-ID> . . . </C-ID>) showing the category codes, and the priority of the information is known by the tags (<PRIORITY> . . . </PRIORITY>) showing the priority. When the information is stored in the storing apparatus 61 of the storage device 22, the information can also be used to control the supplied information stored in the storing apparatus 61. That is, the supplied information is successively stored in the storing apparatus 61 of the storage device 22 as mentioned above. However, since the storing apparatus 61 has a limited memory capacity, when new information is to be stored, it is necessary to delete unnecessary information.

Figure 10:
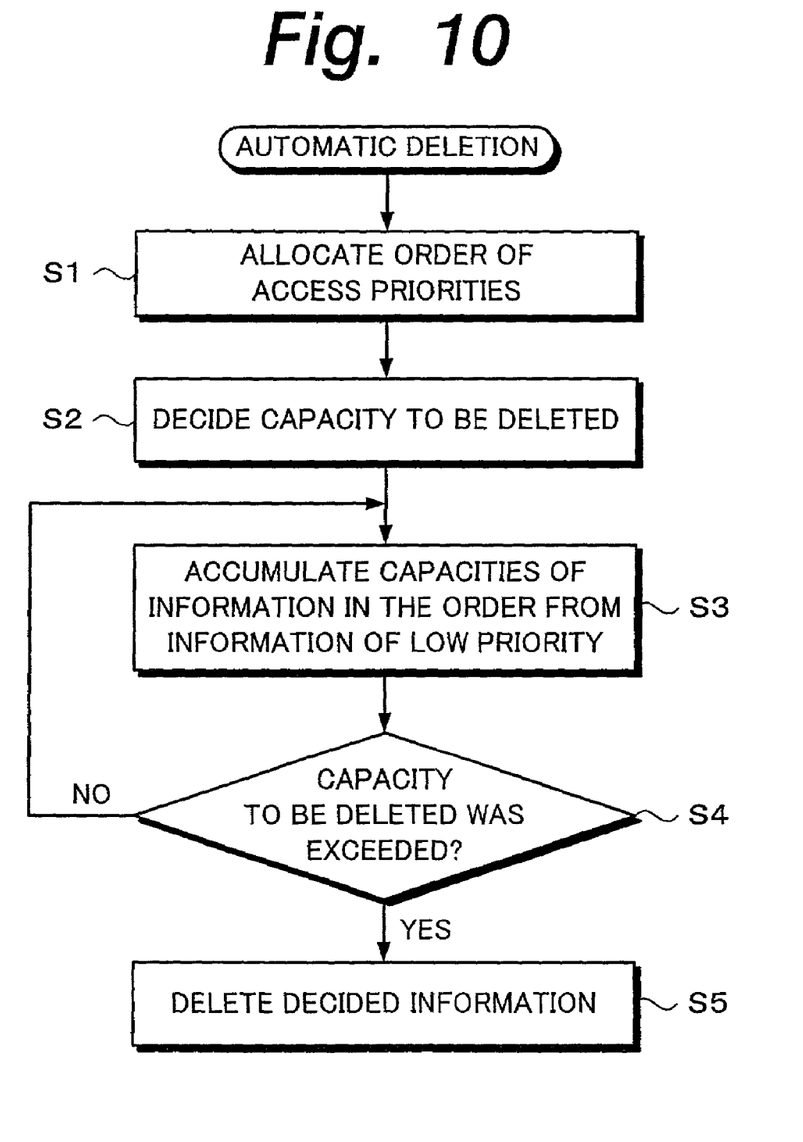
FIG. 10 is a flowchart for use in explanation of the automatic deletion of information.

FIG. 10 is a flowchart showing processes for automatically setting a vacant capacity in the storing apparatus 61 on the basis of the access tendency of the user or the priority or both of these values. In FIG. 10, the order is allocated to the access priority for each information item (step S1). As an access priority, it is possible to use the access tendency of the user which can be known by the tags (<C-ID> . . . </C-ID>) showing the category codes, the priority of the information which can be known by the tags (<PRIORITY> . . . </PRIORITY>) showing the priority, or the general priority determined by the equation described above.

After the order is allocated to the access priority of each information, the amount of memory capacity to be deleted is determined (step S2). As a method of determining the capacity to be deleted, for example, 10% of the memory capacity at that point in time may be deleted once a week. The method of determining the capacity to be deleted is not limited to such a method.

The storage volume of the information is accumulated in the order of access priority ordered in step S1 from the lowest access priority to the highest (step S3). A check is made to see if the storage volume of the information item having the lowest access priority exceeds the deletion capacity determined in step S2 (step S4). If the storage volume of the information item does not exceed the capacity to be deleted, the processing routine is returned to step S3. The storage volume of the information item having the second lowest access priority is then added to the storage volume of the previous information item to produce an accumulated storage volume which is compared to the capacity to be deleted. If it is determined in step S4 that the accumulated storage volume (accumulated in order from the lowest access priority) exceeds the deletion capacity, the information corresponding to the information items accumulated so far is deleted (step S5).

Figure 11:
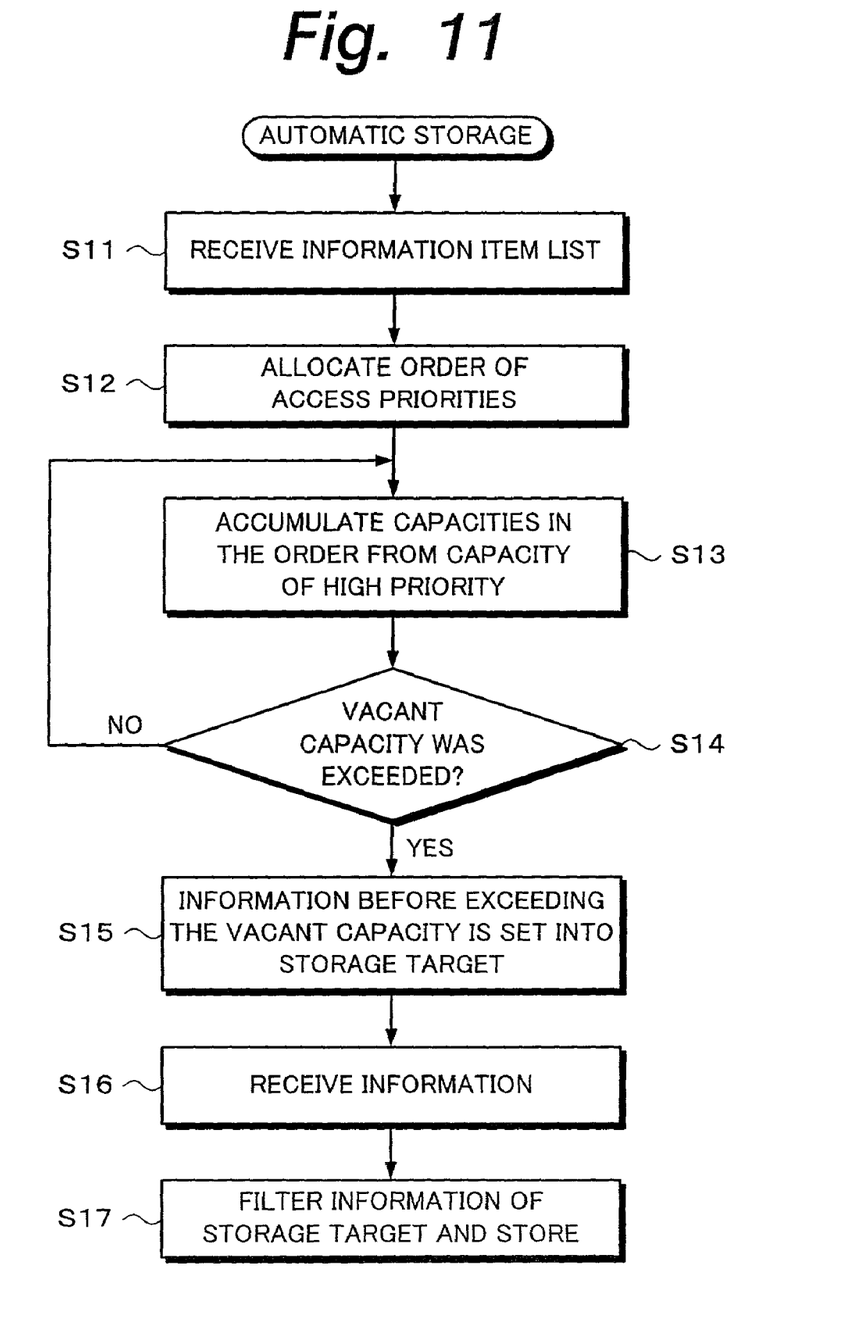
FIG. 11 is a flowchart for use in explanation of the automatic storage of information.

FIG. 11 is a flowchart showing processes for filtering the information of high access priority and storing it in the storing apparatus 61 on the basis of the access tendency of the user, the significance of the information, or both of these values.

Figure 12:
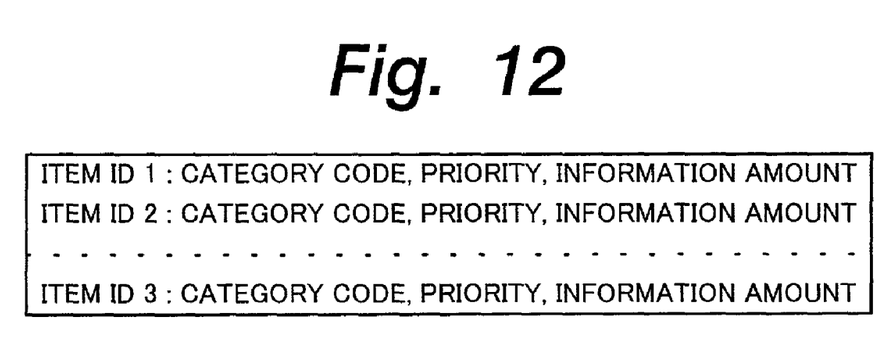
FIG. 12 is a schematic diagram for use in explanation of the automatic storage of information.

In this example, prior to transmitting the information from the information distribution center 1 through the broadcasting station 3 and BS satellite 4, the information item list is sent from the information distribution center 1. As shown in FIG. 12, the category code, priority, and information amount are included for every item in the information item list.

In FIG. 11, the information item list sent from the information distribution center 1 is received (step S11). On the basis of the information in the information item list, an order is allocated to the access priority for each item of information (step S12). As an access priority, it is possible to use the access tendency of the user which is known from the category code, the priority of the information, or the general priority. After an order is allocated to the access priority for each information item, the storage volume of the information is accumulated in order from the highest access priority to the lowest (step S13). A check is made to see if the storage volume of the information item having the highest access priority exceeds the vacant capacity of the storing apparatus 61 (step S14). If the storage volume of this information item does not exceed the vacant capacity, the processing routine is returned to step S13. The storage volume of the information item having the second highest access priority is then added to the storage volume of the previous information item to produce an accumulated storage volume which is compared to the vacant capacity of the storage apparatus 61. If it is determined in step S14 that the accumulated storage volume (accumulated in order from the highest access priority) exceeds the vacant capacity of the storing apparatus 61, information items accumulated just before the accumulated storage volume exceeded the vacant capacity are stored as a target of the storage information (step S15). When the information items are transmitted from the information distribution center 1 through the broadcasting station 3 and BS satellite 4, the information items are received (step S16). The information items stored as a target of the storage information set in step S15 are filtered and stored in the storage apparatus 61 (step S17).

As mentioned above, according to the invention, the attribute information showing the categories of the information may be pre-designated. When the information stored in the storage device is viewed, the number of accesses for each category of information is counted using the attribute information showing the category of the information. The access tendency of the user is determined from the count value of each accessed category. The access priority is determined from the access tendency of the user obtained by counting the number of times the information of each category has been accessed. The access priority may also be determined from the attribute information showing the priority of the information. By using the access priority, it is possible to determine the order of the information items in the table listing the information items (such as highest access priority to lowest), delete the information items in order to assure a vacant area in the storage device, or add new information items.

When the information stored in the storage device is deleted in order to assure a vacant area in the storage device, the access priority is determined either from the access tendency of the user obtained by counting the number of times the information of each category has been accessed or from the attribute information showing the priority of the information, and the information is deleted in order from the lowest access priority. Thus, the information is automatically deleted from the storage device in an order from information that is not frequently used or from information having low significance, thereby assuming vacant capacity in the storage device.

When new information is stored in the storage device, the access priority is determined from the access tendency of the user obtained by counting the number of times the information of each category has been accessed or from the attribute information showing the priority of the information, and the information of the highest access priority is filtered and stored. Thus, information whose use frequency is considered to be high for the user or information of the highest significance is automatically stored in the storage device.

The information distribution center 1 can also use the list of the category codes received from each user together with marketing information. That is, the list of the category codes sent from the user shows the extent to which certain goods or the like meet a user's tastes, and is important information for automobile dealers or the like, and can be used for marketing. For example, the information distribution center 1 can receive a predetermined commission from the dealers who want to receive and view the list of the category codes.

Although the above example has been described with respect to a system for sending the information by BS broadcast, the invention is not limited to such a system. In the above example, although (<C-ID> . . . </C-ID>) are used as tags showing category codes and (<PRIORITY> . . . </PRIORITY>) are used as tags showing the priority of information, such a description is shown as a mere example and, naturally, the invention is not limited thereto.

The invention claimed is:

1. A method of transmitting items containing content information to a user terminal and reproducing a selected one of said transmitted items at a time selected by a user of said user terminal, comprising:
providing a user terminal;
transmitting information items to said user terminal, at least some of said transmitted items containing content information including at least one of moving images or audio sound;
at said user terminal, receiving said transmitted items containing content information and assigning access priorities to said received items;
selecting some of said received items containing content information on the basis of information representing said access priorities;
selectively storing said selected items in said user terminal;
arranging said stored items of information in an order according to said access priorities; and
at a user-selected time after storing said selected items, user selecting one of said stored items and causing said at least one of moving images or audio sound to be reproduced from said user-selected item.

2. The method as claimed in claim 1, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said user terminal, counting a number of times said transmitted items in each said category are accessed by a user to obtain count values of said plurality of categories, and iv) determining said access priorities from said count values.

3. The method as claimed in claim 1, wherein said access priority of each said selected item is determined by second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said user terminal to determine said access priority for each said selected item.

4. The method as claimed in claim 1, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said user terminal, counting a number of times said transmitted items in each said category are accessed by a user to obtain count values of said plurality of categories, and iv) determining said access priorities from said count values and by second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said user terminal to determine said access priority for each said selected item.

5. A method of transmitting items containing content information to a user terminal and reproducing a selected one of said transmitted items at a time selected by a user of said user terminal, comprising:
providing a user terminal;
transmitting information items to said user terminal, at least some of said transmitted items containing content information including at least one of moving images or audio sound;
at said user terminal, receiving said transmitted items containing content information and assigning access priorities to said received items;

selecting some of said received items containing content information on the basis of information representing said access priorities;

selectively storing said selected items in said user terminal;

deleting at least one of said stored items from said user terminal in an order beginning with said stored item having a lowest one of said access priorities; and at a user-selected time after storing said selected items, user selecting one of said stored items and causing said at least one of moving images or audio sound to be reproduced from said user-selected item.

6. The method as claimed in claim 5, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said user terminal, counting a number of times said transmitted items in each said category are accessed by a user to obtain count values of said plurality of categories, and iv) determining said access priorities from said count values.

7. The information processing method as claimed in claim 5, wherein said access priority of each said selected item is determined by second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said user terminal to determine said access priority for each said selected item.

8. The information processing method as claimed in claim 5, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said user terminal, counting a number of times said transmitted items in each said category are accessed by a user to obtain count values of said plurality of categories, and iv) determining said access priorities from said count values and second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said user terminal to determine said access priority for each said selected item.

9. An information receiving apparatus operable to receive transmitted items containing content information and to reproduce a selected one of said transmitted items at a time selected by a user, comprising:

a receiver operable to receive items containing content information transmitted to said information receiving apparatus;

a controller operable to select some of said received items, said selected items containing content information including at least one of moving images or audio sound, said selected items being selected on the basis of information representing access priorities for respective ones of said selected items;

an information storing unit operable to selectively store said selected items; and an information forming unit operable to arrange each of said stored items in an order according to said access priorities, said controller being further operable to permit a user to select one of said stored items containing content information at a user-selected time after storing said user-selected item and to cause said at least one of moving images or audio sound to be reproduced from said user-selected item.

10. The information receiving apparatus as claimed in claim 9, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said information receiving apparatus, counting a number of times said transmitted items in each said category are accessed by a user to obtain count values of said plurality of categories, and iv) determining said access priorities from said count values.

11. The information receiving apparatus as claimed in claim 9, wherein said access priority of each said selected item is determined by second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said information receiving apparatus to determine said access priority for each said selected item.

12. The information receiving apparatus as claimed in claim 9, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii), using said transmitted category attribute information at said information receiving apparatus, counting a number of times said transmitted items in each said category are accessed by a user to obtain count values of said plurality of categories, and iv) determining said access priorities from said count values and said second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said information receiving apparatus to determine said access priority for each said selected item.

13. An information receiving apparatus operable to receive transmitted items containing content information and to reproduce a selected one of said transmitted items at a time selected by a user, comprising:

a receiver operable to receive items containing content information transmitted to said information receiving apparatus;

a controller operable to select some of said received items, said selected items containing content information including at least one of moving images or audio sound, said selected items being selected on a basis of information representing access priorities for respective ones of said selected items; and an information storing unit operable to selectively store said selected items, wherein said controller is further operable to delete at least one of said stored items in an order beginning with said stored item having a lowest one of said access priorities and to permit a user to select one of said stored items containing content information at a user-selected time after storing said user-selected item and to cause said at least one of moving images or audio sound to be reproduced from said user-selected item.

14. The information receiving apparatus as claimed in claim 13, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said information receiving apparatus counting a number of times said transmitted items in each said category are accessed by a user to obtain count values of said plurality of categories, and iv) determining said access priorities from said count values.

15. The information receiving apparatus as claimed in claim 13, wherein said access priority of each said selected item is determined by second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said information receiving apparatus to determine said access priority for each said selected item.

16. The information receiving apparatus as claimed in claim 13, wherein said access priority of each said selected item is determined by first processing including i) associating with each of said information items category attribute information corresponding to a category assigned to the content information contained in each said information item, said category being one of a plurality of categories, ii) transmitting said category attribute information associated with each said transmitted item, iii) using said transmitted category attribute information at said information receiving apparatus counting a number of times said transmitted items in each said category are accessed by a user to obtain count values of said plurality of categories, and iv) determining said access priorities from said count values and second processing including i) associating with each of said information items priority attribute information corresponding to a priority assigned to the content information contained in each said information item, said priority being one of a plurality of priorities, ii) transmitting said priority attribute information associated with each said transmitted item, and iii) using said transmitted priority attribute information at said information receiving apparatus to determine said access priority for each said selected item.

* * * * *